(12) United States Patent
Bond

(10) Patent No.: US 8,579,705 B1
(45) Date of Patent: Nov. 12, 2013

(54) SOFTWARE VERIFICATION AND AUTHENTICATION

(76) Inventor: Eugene Thomas Bond, Las Vegas, NV (US)

(*) Notice: Subject to any disclaimer, the term of this patent is extended or adjusted under 35 U.S.C. 154(b) by 0 days.

(21) Appl. No.: 09/720,042

(22) PCT Filed: Jun. 17, 1999

(86) PCT No.: PCT/AU99/00486
§ 371 (c)(1),
(2), (4) Date: May 6, 2004

(87) PCT Pub. No.: WO99/65579
PCT Pub. Date: Dec. 23, 1999

Related U.S. Application Data

(60) Provisional application No. 60/089,654, filed on Jun. 17, 1998.

(51) Int. Cl.
*A63F 13/12* (2006.01)
*H04K 1/02* (2006.01)
*H04L 9/32* (2006.01)
*G07F 17/32* (2006.01)

(52) U.S. Cl.
CPC ........ *G07F 17/3227* (2013.01); *G07F 17/3223* (2013.01); *G07F 17/3241* (2013.01); *A63F 2300/401* (2013.01)
USPC .................... 463/29; 463/24; 463/42; 463/43

(58) Field of Classification Search
CPC ............ G07F 17/3227; G07F 17/3223; G07F 17/3241; A63F 2300/401; A63F 13/12; H04K 1/02; H04L 9/32
USPC .............. 463/29, 24, 40–43; 380/251, 28–30; 381/251; 713/176, 179–181, 155, 187
See application file for complete search history.

(56) References Cited

U.S. PATENT DOCUMENTS

| | | | | |
|---|---|---|---|---|
| 4,321,672 A * | 3/1982 | Braun et al. | ...... | 705/42 |
| 5,239,584 A * | 8/1993 | Hershey et al. | ...... | 380/28 |
| 5,267,315 A * | 11/1993 | Narita et al. | ...... | 705/67 |
| 5,297,208 A * | 3/1994 | Schlafly et al. | ...... | 380/261 |
| 5,321,751 A * | 6/1994 | Ray et al. | ...... | 713/186 |
| 5,341,426 A * | 8/1994 | Barney et al. | ...... | 713/171 |
| 5,355,413 A * | 10/1994 | Ohno | ...... | 713/159 |
| 5,539,828 A * | 7/1996 | Davis | ...... | 713/173 |
| 5,643,086 A * | 7/1997 | Alcorn et al. | ...... | 463/29 |
| 5,700,195 A * | 12/1997 | Halic | ...... | 463/29 |
| 5,707,286 A * | 1/1998 | Carlson | ...... | 463/16 |
| 5,923,249 A * | 7/1999 | Muir | ...... | 340/545.1 |
| 6,071,190 A * | 6/2000 | Weiss et al. | ...... | 463/25 |
| 6,106,396 A * | 8/2000 | Alcorn et al. | ...... | 463/29 |
| 6,149,522 A * | 11/2000 | Alcorn et al. | ...... | 463/29 |
| 6,210,274 B1 * | 4/2001 | Carlson | ...... | 463/16 |
| 6,264,561 B1 * | 7/2001 | Saffari et al. | ...... | 463/42 |
| 6,364,769 B1 | 4/2002 | Weiss et al. | | |
| 6,527,638 B1 * | 3/2003 | Walker et al. | ...... | 463/25 |
| 6,620,047 B1 * | 9/2003 | Alcorn et al. | ...... | 463/37 |
| 6,805,634 B1 | 10/2004 | Wells et al. | | |
| 6,968,405 B1 * | 11/2005 | Bond et al. | ...... | 710/72 |
| 6,986,055 B2 * | 1/2006 | Carlson | ...... | 713/300 |
| 7,043,641 B1 * | 5/2006 | Martinek et al. | ...... | 713/187 |
| RE39,368 E * | 10/2006 | Alcorn et al. | ...... | 463/29 |
| RE39,369 E * | 10/2006 | Alcorn et al. | ...... | 463/29 |
| RE39,370 E * | 10/2006 | Alcorn et al. | ...... | 463/29 |
| RE39,400 E * | 11/2006 | Alcorn et al. | ...... | 463/25 |
| RE39,401 E * | 11/2006 | Alcorn et al. | ...... | 463/29 |
| 7,203,841 B2 * | 4/2007 | Jackson et al. | ...... | 713/187 |
| 7,217,190 B2 * | 5/2007 | Weiss | ...... | 463/25 |

FOREIGN PATENT DOCUMENTS

| | | | | |
|---|---|---|---|---|
| EP | 0 464 811 A2 * | 1/1990 | ............ | G11B 20/10 |
| EP | 0 360 613 B1 * | 1/1995 | ............ | G07F 17/34 |
| GB | 2121569 A | 12/1983 | | |
| JP | 10 024148 A | 1/1998 | | |
| WO | WO 96/21974 A1 * | 7/1996 | ............ | H03M 9/00 |
| WO | WO 96/24900 A1 * | 8/1996 | ............ | G06F 12/14 |
| WO | WO 98/00818 A1 * | 1/1998 | ............ | G07F 17/34 |
| WO | WO 98/40140 A1 * | 9/1998 | ............ | A63F 9/24 |
| WO | WO 99/67721 A1 * | 12/1999 | ............ | G06F 17/00 |

OTHER PUBLICATIONS

Derwent abstract for WO 98/35309 A1.* Derwent abstract for WO 96/21916 A1.*

* cited by examiner

*Primary Examiner* — David L Lewis
*Assistant Examiner* — Matthew D. Hoel
(74) *Attorney, Agent, or Firm* — McAndrews, Held & Malloy, Ltd.

(57) ABSTRACT

A device for controlling electronic gaming machines comprises a single board computer (SBC) having a microprocessor, memory means, storage means and a ROM (Read Only Memory). The ROM includes: a loader program; verification program; an authentication program; and a presentation program. Additional Mass storage media in communication with the SBC store pre-verified and approved gaming software (program files) and related data files, each of which have a verification signature appended to them. Prior to usage of the gaming software, the program file software or data file is retrieved by the loader program and checked by the verification program which compares the verification signature with a newly calculated verification signature. If the newly calculated signature matches the verification signature, the requested file is deemed to be intact (a validated image). The verification processes ensure that the file has been retrieved in its entirety and is free from corruption caused by storage media faults. If any corruption has occurred, the control device displays an error and the process is halted. After verification, all pending requests for authorization from authentication agents are processed by a queuing means. Each request includes a set of authentication instructions and a reply destination. After queuing, an authentication interpreter processes the validated image pursuant to the requester's instruction. The presentation program reports the resulting authentication identification to the requested destination which either acknowledges or refuses authentication. If acknowledged, the image is used or executed. If refused, an error is displayed and the process is halted.

27 Claims, 4 Drawing Sheets

SOFTWARE VERIFICATION AND AUTHENTICATION

CROSS-REFERENCE TO RELATED APPLICATIONS/INCORPORATION BY REFERENCE

This application is a National Phase filing of International Application No. PCT/AU99/00486, filed Jun. 17, 1999, entitled "SOFTWARE VERIFICATION AND AUTHENTICATION", which claims priority to U.S. Provisional Application No. 60/089,654, filed Jun. 17, 1998, the entirety of each of the above applications is incorporated herein by reference.

BACKGROUND OF THE INVENTION

This invention relates to ensuring the compliance, integrity and authenticity of microprocessor-based gaming devices utilized in regulated gaming jurisdictions. These devices are commonly referred to as slot machines or video poker machines; however, more recent implementations have combined both aspects and offer a variety of games on a single machine referred to as a multi-game machine. A commonly configured multi-game machine would include a plurality of games such as: keno, poker, slots, blackjack and others. These games can be played separately or be combined together to form new games, games within games, thus pushing the limits of gaming software and hardware capabilities. As the complexity of these gaming devices increases, the difficulty of ensuring regulatory compliance increases.

Typical gaming machines of this type utilize a combination of mechanical devices, electronics, microprocessors and complex software to generate the gaming experience. Some of the common hardware components include a cabinet, handle, jackpot tower, coin acceptor, bill acceptor, credit meters, back-lit glass, reels, monitors, game doors, buttons, payout hoppers, lights and speakers. The electronics include many of the following components: microprocessor, (also referred to as a central processing unit ("CPU")), read only memory (ROM), random access memory (RAM), high speed data bus, peripheral logic chips for serial and parallel ports and driver circuitry for lamps, speakers, video and other devices. Typical software components include: power-up initialization, device drivers, game recovery, state machines (to monitor whether the game is in a state of active play, "sleeping" between active play or off), random number generator, payout routine, credit management, graphics engine, sound, game engine, game data, security, accounting and reporting functions.

In jurisdictions where gaming is legal, use of such gaming devices is regulated by law. This invention is designed to aid in complying with two kinds of gaming regulations: those requiring automated verification of the device's integrity, and those requiring a method of determining the authenticity of the device.

As will be described below, verification and authentication are separate processes. Verification of the gaming software is usually performed before and during game play. Verification is done initially to make certain that the program code or other data stored in the gaming device is intact and functioning properly by methods known to those skilled in the art. In the case of verification, the gaming device's software is usually required to be check-summed or cyclic redundancy checked (CRC). During program execution (i.e., the course of game play) the software images are periodically re-checked in order to ensure that the storage media in which the program code/data is stored has not become corrupted. This periodic verification is important because media corruption has been known to generate erroneous jackpots.

Occasionally, the software is authenticated, which is typically a process carried out by a third party (other than the manufacturer or the operator/casino) representing the gaming enforcement agency that has jurisdiction over the device. Its purpose is to ensure that the software controlling the game has not been tampered with, and software authentication is usually required after a large jackpot has been obtained by a player. Authentication also verifies that the gaming software was previously examined and approved by the gaming agency in whose jurisdiction the jackpot occurred.

In addition, the casino likes to verify that the software running the game is legitimate particularly if the machine is not earning the expected amount of revenue or in response to player complaints about the behavior of a particular game.

In prior art devices, authentication is usually accomplished by one of two methods. Both methods require the opening of the game, the removal of CPU and the removal of software, typically stored in EPROMS, (Electronically Programmable Read Only Memory) from the CPU. Then. in the first method, the removed EPROMS are compared with a custodial (or master) set of EPROMS which have been kept in a secure location. If the comparison indicates that they are the same, the software is considered to be authentic. The second method involves plugging each EPROM into an electronic authentication device which generates an authentication identification (id) for the image resident in the EPROM. The resulting authentication ids are compared to previously recorded ids for those EPROMS. If they are identical, the software is labeled authentic.

Existing authentication methods are well-suited to prior art devices which use ROM type storage; and which typically are stand-alone gaming machines. However, with the advent of new storage technologies, increased storage requirements of modern operating systems, and multi-game multimedia gambling devices involving a plurality of gaming machines in communication with each other, the prior art methods are no longer sufficient.

And though Silicon Gaming has invented a method for "authenticating" software stored in other media. it ignores the existing authentication paradigm presently accepted in gaming. Thus, there is a need for a means of verifying and authenticating software stored in modern media that is compatible with existing gaming regulations and practices. It is also believed that such methods should take into account the practice of relating software and modular functionality to EPROMS like prior art systems. The industry is comfortable with having a set of EPROMS for "System" software and a set for each model (comprising unique pay schedule, symbols, and/or play rules), or a set for each game in a multi-game environment. It is further thought that remote authentication is desirable to said agencies. Lastly, it is thought that a method of authentication that does not require the removal of gaming software from the machine is desirable to the operator.

SUMMARY OF THE INVENTION

It is an object of the present invention to provide a device for use within a gaming machine, such as a slot machine or a multi-game machine, which allows for continuous verification of gaming software stored in modern media in a manner consistent to that which occurs in EPROM based prior art systems.

Still another object of the present invention is to provide a device for use within a gaming machine, such as a slot machine or a multi-game machine, which allows for verification of data files.

Still another object of the present invention is to provide a method that can be used within a gaming machine, that will allow software authentication without requiring the removal of gaming software (program files) from within the gaming machine.

Still another object of the present invention is to provide a method that allows for authentication of the gaming software (program files) without requiring removal of the central processing unit from the gaming machine.

Still another object of the present invention is to provide a method that allows for authentication of the gaming software (program files) from a remote location.

Still another object of the present invention is to provide a method that allows for authentication of the gaming software (program files) according to specifications set forth by the $I^2C$.

Still another object of the present invention is to provide a method that allows for authentication of the gaming software (program files) from within the gaming machine.

Still another object of the present invention is to provide a method that can be used within a gaming machine, that will allow data file authentication without requiring the removal of the data files from the gaming machine.

Still another object of the present invention is to provide a method that allows for authentication of the data files without requiring removal of the central processing unit from the gaming machine.

Still another object of the present invention is to provide a method that allows for authentication of the data files from a remote location.

Still another object of the present invention is to provide a method that allows for authentication of data files according to specifications set forth by the $I^2C$.

Still another object of the present invention is to provide a method that allows for authentication of the data files from within the gaming machine.

Still another object of the present invention is to provide a method of relating gaming software stored in non-EPROM media as if it were embodied in EPROM media.

Still another object of the present invention is to provide a method of configuring gaming software stored in non-EPROM media as if the software were embodied in EPROM media.

Still another object of the present invention is to provide a method of reporting gaming software stored in non-EPROM media as if the software were embodied in EPROM media.

Still another object of the present invention is to provide a method of verifying gaming software stored in non-EPROM media as if it were embodied in EPROM media.

Still another object of the present invention is to provide a method of authenticating gaming software stored in non-EPROM media as if it were embodied in EPROM media.

Still another object of the present invention is to provide a method of representing gaming software stored in non-EPROM media as if it were embodied in EPROM media.

Still another object of the present invention is to register the agent making the authentication request.

The present invention is a control system for electronic gaming machines which comprises a control means having a microprocessor, memory means, storage means, a means for operating the gaming machine, a plurality of program means and a plurality of data means, a ROM (Read Only Memory), a plurality of input/output means, a means for receiving power and a means for supplying power. The ROM includes means to verify and authenticate the program means and the data means, in response to a request from a requesting agent, which is external to the control system. The requesting agents can be located externally with respect to the gaming machine, or can be located within the gaming machine. The verification and authentication means include a loader program, a verification program, an authentication program, and a presentation program. Mass storage media in communication with the control means store pre-verified and approved gaming software (program files) and related data files, each of which has a unique verification signature (or identification means) appended to them. Prior to usage of the gaming software, a program file or data file is retrieved by the loader program and checked by the verification program, which compares the verification signature with a newly calculated verification signature. If the newly calculated signature matches the verification signature, the requested file is deemed to be intact (a validated image). The verification process ensures that the file has been retrieved in its entirety and is free from corruption caused by storage media faults. The control system also includes means to control the operation of the verification program and the gaming machine, depending on the outcome of the verification program and the authentication program, respectively. If any corruption has occurred, the control device displays an error message and the verification process is halted. After verification, all pending requests for authentication from authentication agents (requesting agents) are processed by a queuing means. Each request includes a set of authentication instructions and a reply destination (a responder means). The responder means is external to the control system, and can be situated either externally with respect to the gaming machine, or internally in the gaming machine. After queuing, an authentication interpreter processes the validated image pursuant to the requester's instruction. The presentation program reports the resulting authentication identification to the requested destination which either acknowledges or refuses authorization. If acknowledged, the image is used; if refused, an error is displayed and the process is halted.

The present invention offers a number of benefits. First, the present invention allows one or more external authenticating agents to perform the authentication process. This results in better accountability to regulatory authorities because the manufacturer is not certifying its own authenticity. Second, each authenticating agent can use its own method (or multiple methods) of authentication using unique supplied authentication math instruction sets. Further, the same system can be used by the software manufacturer during the software release and/or upgrade process to ensure that the correct configuration of software has been installed on the gaming machine. This method is capable of distinguishing between media corruption and deliberate tampering of software components. In-house tampering or rigging of the software could also be detected if each department within the manufacturer has its own authentication instruction set; one group could easily check the work of another. Additional advantages include authentication which can be remotely accomplished; authentication requests are queued by the invention and can be flexibly scheduled; software can be managed as related groups through the V-PROM registry; and a wider range of gaming hardware can be used due to the hardware abstraction aspects of the registry.

The V-PROM (Virtual Programmable Read Only Memory) Registry aids in the retrieval and management of related stored binary information by logically grouping discrete data and program entities together as if they were stored in ROM type media.

The V-PROM Registry is a program/data directory which provides crucial information used in the management, retrieval and authentication of related programs and data sets. In prior art gaming inventions, related programs and data are typically stored in the same EPROM set. In such inventions, it is not uncommon to find a dozen system tasks or more stored in the same EPROM set—a set is typically comprised of two EPROMS, the first containing the data stored in the odd-numbered addresses and the second containing the data stored in the even-numbered addresses. However, when using general purpose storage media such as a hard drive, the tendency, due to modern operating system design, is to store each process, task and data set as a separate discrete file. Using modular development techniques, it is not unusual to have thirty or more processes and several dozen data images stored on a hard drive in the form of files. Authentication of prior art systems is easily accomplished, being done at the EPROM level, resulting in one authentication id for each EPROM, a typical gaming device having one to twelve EPROMS. Whereas, the job of authenticating one hundred plus discrete files on a hard drive is a much more difficult and error-prone task. In order to maintain the same kind of one-to-many grouping characteristics naturally occurring in ROM style media, a relational database directory was designed to store logical EPROM-like grouping information, termed the V-PROM Registry. The Registry contains the location and media type of related stored programs and data sets, each group having a unique V-PROM name. As an added benefit, the V-PROM Registry abstracts the type of storage media from the authentication process thus allowing for the use of a wider variety of storage media.

The final step of the software installation phase is to update the directory of installed software in the V-PROM Registry, noting the images' storage locations, media types and defining logical groupings for related programs and associated data.

V-PROMS are logical containers that contain software and related data. V-PROMS can also contain other V-PROMS, thus, a given software configuration can be stored as a V-PROM containing a series of "smaller" V-PROMS which describe all of the software games to be installed for a specific operator/casino installation. Subsequently, by authenticating the "parent" V-PROM, the whole software installation can be verified.

BRIEF DESCRIPTION OF THE DRAWINGS

The invention will be better understood by a Detailed Description of the Invention, with reference to the drawings, of which.

DETAILED DESCRIPTION OF THE PREFERRED EMBODIMENT

Figure 1:
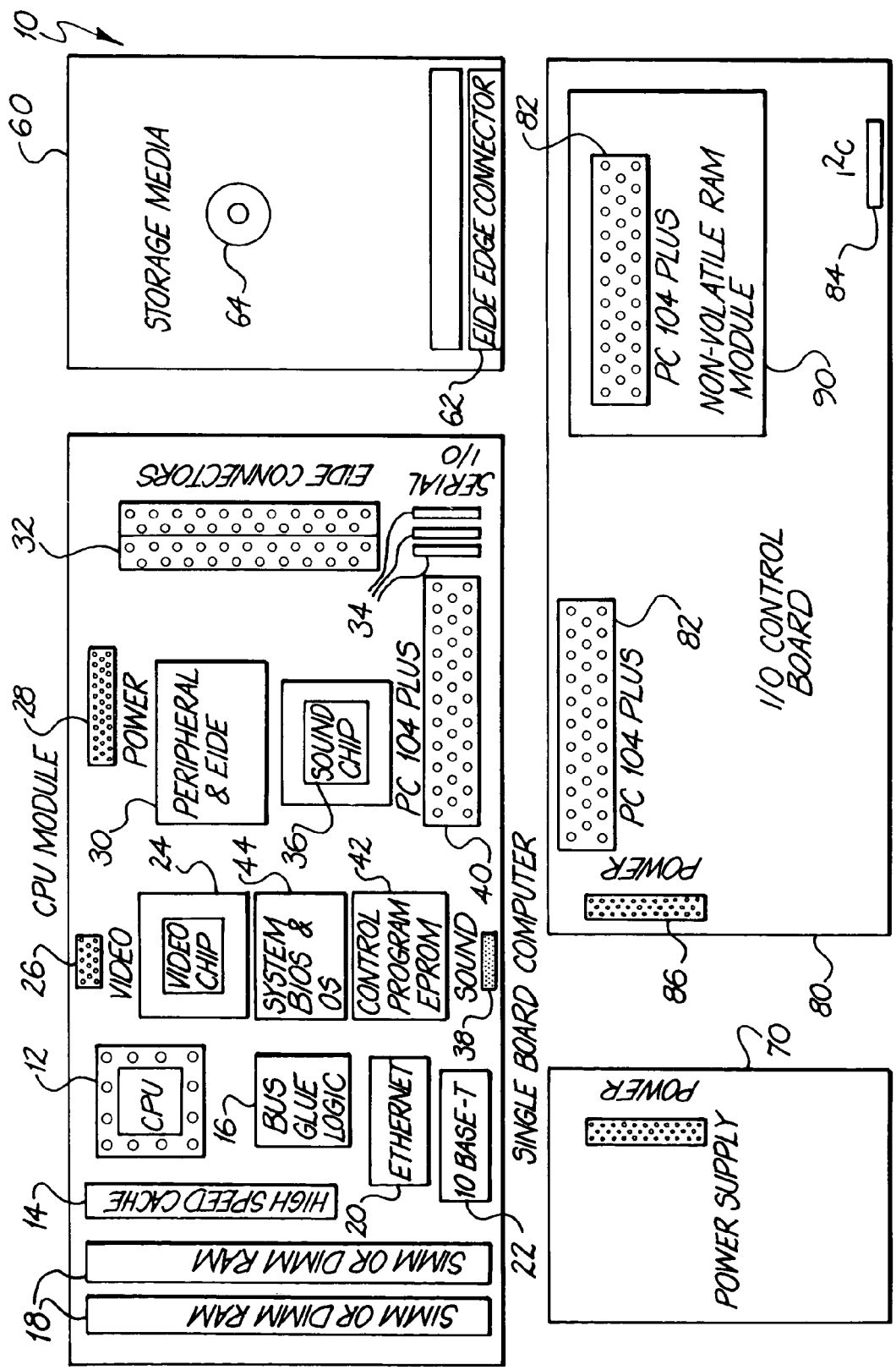
FIG. 1 is a schematic diagram of the device of the present invention and related hardware components.

FIG. 1 illustrates the hardware components utilized in the preferred embodiment of this invention. Other hardware configurations are possible because of the modular nature of this design. The present invention is a control system 10 for a gaming machine. The gaming machine is not shown, but can be either a slot machine, a video poker machine, or a newer implementation which has combined aspects of both types of machines and offers a variety of games on a single machine referred to as a multi-game. A commonly configured multi-game machine includes a plurality of games such as: keno, poker, slots, blackjack and others. Typical gaming machines of this type utilize a combination of mechanical devices, electronics, microprocessors and complex software to generate the gaming experience. Some of the common hardware components used are as follows: a cabinet, handle, jackpot tower, coin acceptor, bill acceptor, credit meters, back-lit glass, reels, monitor, game door, buttons, payout hopper, lights and speakers.

The control system 10 (FIG. 1) comprises four major modules. The first module is a commercially available Single Board Computer (SBC). Second. Module 60 represents commercially available storage media. Third, module 70 is a commercially available power supply. The fourth module 80 is the custom manufactured Input Output (I/O) Control Board (the "IOCB"). A detailed description of the IOCB is found in NuGame's patent application Ser. No. 60/085,892, for an Intelligent Input/Output control System, filed 18 May 1998. A fifth module 90 is a Non-volatile RAM storage board. All five components are in electronic communication with each other. SBC connects to storage medium 60 through either of an EIDE cable, or a SCSII cable in the case of a SCSII base SBC. SBC also is connected to the IOCB 80 and the non-volatile RAM storage board 90 through a stackable PC104 Plus connector. Power supply 70 supplies power to the other four components via power cables and connectors, components which are known to those skilled in the art. This regulated power supply provides power at the proper voltage and current that each component requires.

In detail, the SBC has the following components in electronic communication with each other. The microprocessor (or CPU) 12 is a x86 CPU such as a Pentium™ or Pentium II™ processor with MMX™ or equivalent technology. CPU 12 is in communication with a high speed processor cache 14 for improved performance; glue logic chips 16 for driving high speed data busses and interfacing the processor 12 to other high speed components such as RAM, video processors, network chips, and I/O boards, High speed RAM sockets 18 typically DIMM or SIMM (Dual Inline Memory Module or Single Inline Memory Module, respectively) style; an integrated high speed network interface 20, such as, but not meant to be limited to, an Ethernet network connection; a network interface connector 22; an integrated high speed video processor, 24 video monitor connection; 26 are also components of the Single Board Computer 10. Other components of the SBC include power connector 28; a custom peripheral I/O cip 30 for driving a plurality of serial I/O, parallel I/O: and a disk subsets such as EIDE or SCSII. A plurality of EIDE or SCSII storage media connectors; 32, a plurality of serial and parallel I/O connections 34; an integrated sound chip 36; sound connection 38; and (9) stackable PC104 Plus connector 40 are also components of the SBC. It is important to note that this invention is not tied to a specific SBC or manufacturer. This is accomplished through the use of a general purpose operating system (OS) and a method of hardware abstraction. The manner of hardware abstraction is described in NuGame's patent application Ser. No. 60/094,068, for an I/O Interface and Device Abstraction, filed 24 Jul. 1998. Thus, the present invention treats the SBC as a component which can be swapped or upgraded as new boards become commercially available.

The second module, also referred to as storage media module 60, represents the use of general use purpose mass storage media. The media represented in storage media module 60 can include: Hard disk drive units, CD-ROMs (Compact Disk-Read Only Memory), solid state storage devices, or other storage media used in the Personal Computer (PC) industry. This media is connected to the SBC through a PC industry standard interface such as EIDE, SCSII, or PCMCIA interface 62. Where spinning media is used, i.e., a hard disk drive unit, a CD-ROM drive unit, or a Digital Video Disk (DVD) drive unit, as examples, reference numeral 64 represents a drive spindle. Other elements that may be unique to a particular type of mass storage medium are not shown. Storage media 60 may also represent a file server connected to the control system. Although the present invention can function without mass storage, it is specifically designed to exploit the advantages of such devices.

A custom I/O Control Board 80 is interfaced to the SBC through a stackable PC-104 Plus connector. This board is responsible for interfacing to all of the machine components utilized in a gaming device. This board also functions as a bridge to other intelligent I/O devices attached to the I$^2$C network at 84, an interface connection. Reference numeral 86 indicates a connector which connects the IOCB 80 with power supply 70. (A detailed description of the IOCB 80 is found in patent application Ser. No. 60/085,892 for an Intelligent Input/Output Control System, filed 18 May, 1998.

Thus, the SBC and the IOCB 30 direct the operation of the various displays, controls, video, sound, and other peripherals of the gaming machine. The operation of SBC, IOCB 80 and the gaming machine(s) is directed by plurality of program files stored within the memory of the system's components.

The verification and authentication program included in the present invention has enhanced media verification, program/data management and authentication capabilities. These attributes enable the control system to better manage the large volume of software and data normally associated with a multi-game gaming device while ensuring the compliance, integrity and authenticity of each component. In addition, this invention also substantially aids in the reduction of software configuration errors that tend to accompany a device of this complexity.

Figure 2:
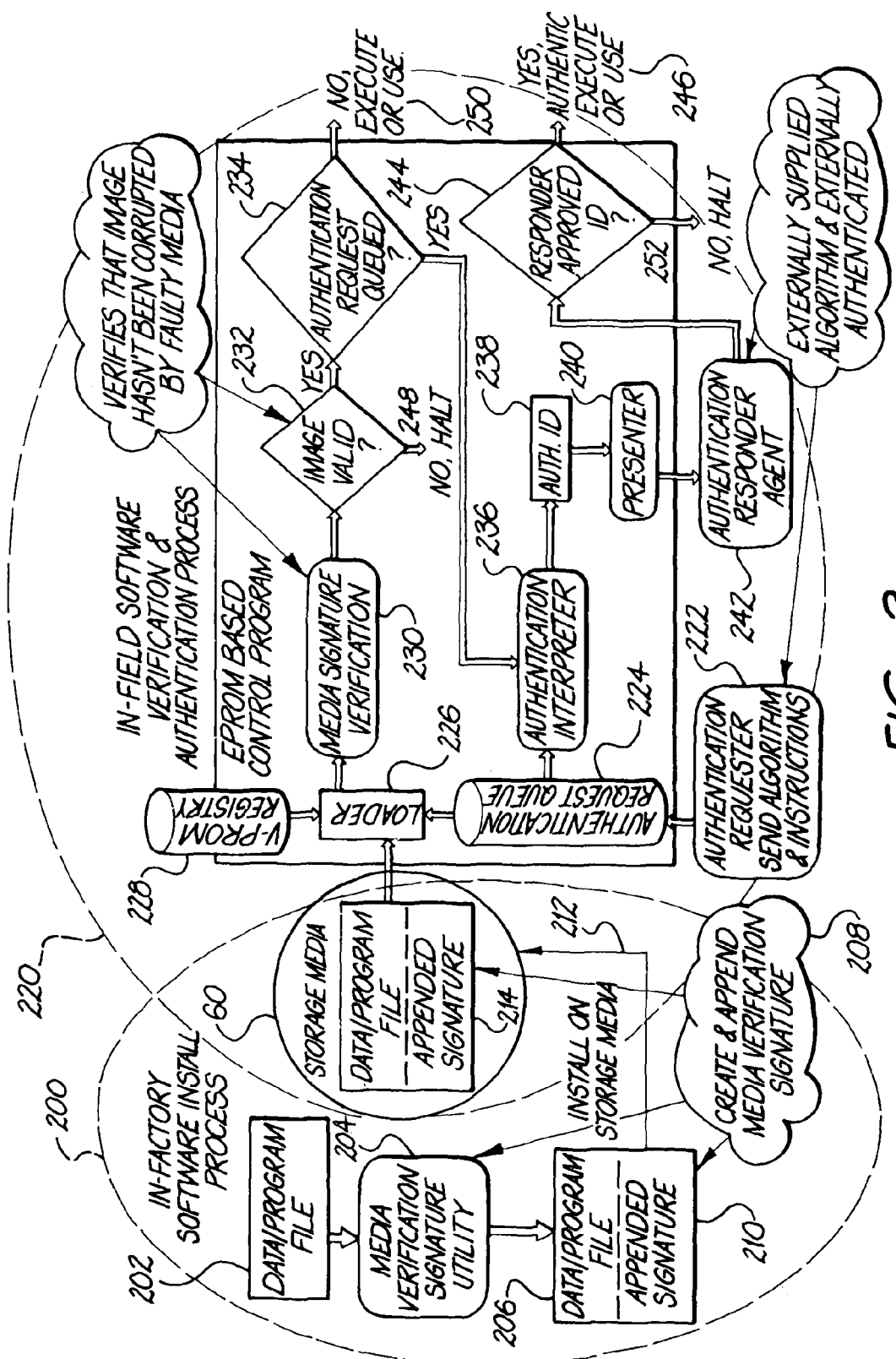
FIG. 2 is a block diagram providing a conceptual overview of the in-factory software installation process and the in-field software verification and authentication process.

FIG. 2 is a diagram of a conceptual overview of the verification and authentication program 199. This verification and authentication program 199 is uniquely distinguished by interactions of three major components and the methods contained therein: a Loader 226 with media verification methods, a data/program directory 228 termed "V-PROM Registry" (Virtual Programmable Read Only Memory), and a distributed Authentication Engine. The Loader 226 functions to retrieve and verify the integrity of data and programs stored on a wide variety of media such as EPROMS, hard drivers, CD-ROMS, flash disks, fileservers, other ROMs such as PROM or EEPROM. The V-PROM Registry 228 aids in the retrieval and management of related stored binary information by logically grouping discrete data and program entities together. Contained within V-PROM Registry 228 are other program files which include relational database and directory functions to perform this logical grouping of the program files and data files. The Authentication Engine is responsible for calculating and reporting authentication identifications (ids) according to instructions found in the pending authentication requests that are associated via V-PROM registry to the programs and related data being loaded. All three of these components interact in order to carryout requests for authentication as shown in FIG. 2, and further described below.

The verification and authentication process to verify the integrity of the images being retrieved by the gaming software is a two-phase process and illustrated in FIG. 2. The first phase, data/program preparation is accomplished by the In-Factory Software Installation Process 200. As its name suggests, the In-Factory Software Install Program is performed at the factory where the gaming machine is produced, prior to shipment. The second phase, software retrieval and verification process 220 is accomplished in the field by the Loader and Media Signature Verification routines located in the EPROM based Control Program stored on SBC. This phase verifies the integrity of the installed media, to make sure the program files and data files contained therein have not been damaged by faulty or defective storage media.

The first phase of the Software Installation configuration verification process 199 is an in-factory phase (also referred to as the data preparation phase 200) and is comprised of installing each processed program or data file 202 utilizing a Media Verification Signature Utility program 204. The media verification signature utility can be chosen from any one of a number of verification programs known to those skilled in the art. The output of this utility is a media verification signature 203. This signature 208 is calculated using either a cyclic redundancy check or a check sum using one of two common methods known to those skilled in the art. The complement 210 of the signature is appended to the end of its associated program or data set 206. The process is repeated for each program to be installed. Programs 208 are then installed on the recipient storage media 60. From storage media 60, the processed data and programs are transferred to the loader 226 for transfer to memory within the EPROM on SBC. The final step of the Installation phase is to update the directory of installed software in the V-PROM Registry 228, which notes the images' storage locations, media types and defines logical groupings for related programs and associated data.

On power-up, the initialization software contained in the control program, not depicted, electronically checks for remotely attached authentication agents, if detected, they are interrogated for their authentication registry information, Name/ID of agency being represented, password if pre-registered and required, the registered agency is noted/logged in Non-volatile storage. An Agent can be installed on-the-fly and registered using NuGame's' Dynamic Hardware Linking technology. Note: Pre-registered agents are entered in the installation process. Agents may be electronic apparatus, or persons interacting with the machine through the console. Either may be asked to enter a password. Many agents can exist simultaneously. Agents can be remotely connected. Agents can be internally or externally located with respect to the machine.

Authentication responders are registered agents. Usually the Agent and the responder are the same person/Apparatus: however, a registered agent can request that an alternative responder agent be referenced, thus, allowing for a person (acting as an agent) to request an authentication which is presented to a handheld apparatus (acting as a second agent) such as laptop computer which acts as a responder. Many other possibilities exist, such as presenting authentication ids via a network connection so that two apparatus or persons are required, one local, one remote to accomplish the authentication process, thus enhancing the security of the process.

After all the gaming and related software has been installed onto the control system 10 by the in-factory install process 200, and the gaming machines are at their final destination, and being installed, or being periodically checked or operated, the second phase, the In-Field Software Verification and Authentication Process 220 is commenced. In the field (i.e. in the casinos, etc.) this process is performed during operation of the gaming device, from time-to-time, and as mandated by state regulatory agencies.

Phase two, the in-field, verification and authentication phase comprises two major steps—the first step being a verification step, and the second being an authentication step. The purpose of the verification step is to verify the integrity of the installed software (as program files and data files) to check that the various files, indicated by their images, have not been corrupted or altered or damaged because of faulty or defective media.

The verification step can be subdivided into the following steps, as outlined in FIG. 2. Whenever there is a request for a V-PROM, program or data set, such as may occur when a player activates the gaming machine to initiate game play the Loader routine 276, references the V-PROM Registry 228 and the loader routine 226 accesses the storage media and places the requested binary image of the data requested program file 208 in the CPU\12's main memory. The Media Signature Verification routine 230 then applies the same algorithm used in the data preparation phase (204) to the loaded image 208 which has an appended complimentary signature 211. Thus, using the check-sum method of verification, and due to the cancellation effect of previously appending the complement of the verification signature, the resulting check-sum value at 232 should be zero when processed again by the same algorithm. A non-zero result at 348 would indicate that the retrieved binary image was corrupted by a media fault resulting in the issuance of a command to halt the operation of the gaming device at 248. A result of zero at 232 indicates that the image has been wholly retrieved without corruption, and depending upon the priority commands given with the initial request, this information is placed in a queue and awaits authentication at 234. If the initial request included a priority command, the requested program is not queued, and can be executed or used immediately at 220.

If the verification method shows that the integrity of the media is intact, the authorization program is initiated. The second major component in the present invention is the V-PROM Registry 228. The V-PROM Registry 228 is a program data directory which provides crucial information used in the management, retrieval and authentication of related programs and data sets. In prior art gaming inventions, related programs and data are typically stored in the same EPROM set. An EPROM set is typically comprised of two EPROMS, the first containing the data stored in the odd numbered addresses and the second containing the data stored in the even numbered addresses.

In such prior art inventions, it is not uncommon to find a dozen system tasks or more stored in the same EPROM set. Authentication of prior art systems is easily accomplished because it is done at the EPROM level, resulting in one authentication id for each EPROM, with a typical gaming device having one to twelve EPROMS. However, the newer gaming devices use general purpose storage media such as a hard drive, where the design of modern operating systems causes each process, task and data set to be stored as a separate discrete file. Using modular development techniques, it is not unusual to have thirty or more processes and several dozen data images stored on a hard drive in the form of files as a result. Thus, the job of authenticating one hundred plus discrete files on a hard drive is a much more difficult and error prone task than authenticating tasks stored on EPROMS. In order to maintain the same kind of one-to-many grouping characteristics naturally occurring in ROM style media, a relational database directory was designed to store logical EPROM-like grouping information, termed the V-PROM Registry 228. Thus, the V-PROM is programmed to determine which program files and which data files are related, and to group them in a logical manner. This grouping program emulates the grouping methods that are characteristically found in ROM-type media, including ROMs, PROM, EPROM or EEPROM. The Registry contains the location and media type of related stored programs and data sets, each group having a unique V-PROM name. As an added benefit, the V-PROM Registry 228 abstracts the type of storage media from the authentication process thus allowing for the use of a wider variety of storage media. The third major component of the present invention is the Authentication Engine which is distributed into several smaller routines as shown in FIG. 2. The Authentication Engine only acts upon authentication requests received from registered agents, a registered agent being an individual, a floor supervisor, system engineer or inspector authorized by a regulatory agency, the software manufacturer, the gaming machine manufacturer, authorized to perform the authentication process.

The software which controls the functioning of the present invention is stored in three different places. EPROM (42) contains the Control Program 220 illustrated in FIG. 2. Storage device (44) contains the BIOS in control system 10. (Basic Input/Output System) and Operating System (OS) software (FIG. 1). The type of storage device (44) varies from SBC to SBC, depending upon the manufacturer: in some cases the BIOS and Operating System software are stored in two separate devices in electronic communication. Software games (program files) and data (data files) are stored on Storage device 60. In some configurations, game software can be stored in a series of EPROMS attached to the PC-104 Plus bus 142 on the Non-volatile RAM module 90. In other configurations, game software can be stored on a file server attached to the network via connector 32. The file server is not shown in the figures.

EPROM 42 contains the following software components (FIGS. 3A and 3B) software component 304C (the I²C driver) is the driver to interface to the IOCB 80. Reference number 224 is an authentication requester queuing routine (see FIG. 2 also). The data loader routine and a media verification routine is shown at reference number 226. The authentication interpreter is reference number 236, and it communicates with authentication presentation routine 240. Serial driver 304A and Network Driver 304B are part of the Operating System stored in the device 44 of the SBC.

Three of the authentication requestors 222, the serial connected authentication requestor 222A, the network connected authentication requestor 222B, and the I²C connected authentication requestor 222C are located externally with respect to the control system 1, shown in FIG. 1.

Similarly, several of the authentication responders, the serial connected authentication responder 242A, the network connected authentication responder 242B, and the I²C connected authentication responder 242C, are externally located with respect to the control system 10 shown in FIG. 1: the internal authentication request to 223 and the internal authentication responder 243 are optional, used by the manufacturer for internal authentication and stored in mass storage device 60.

Figure 3A:
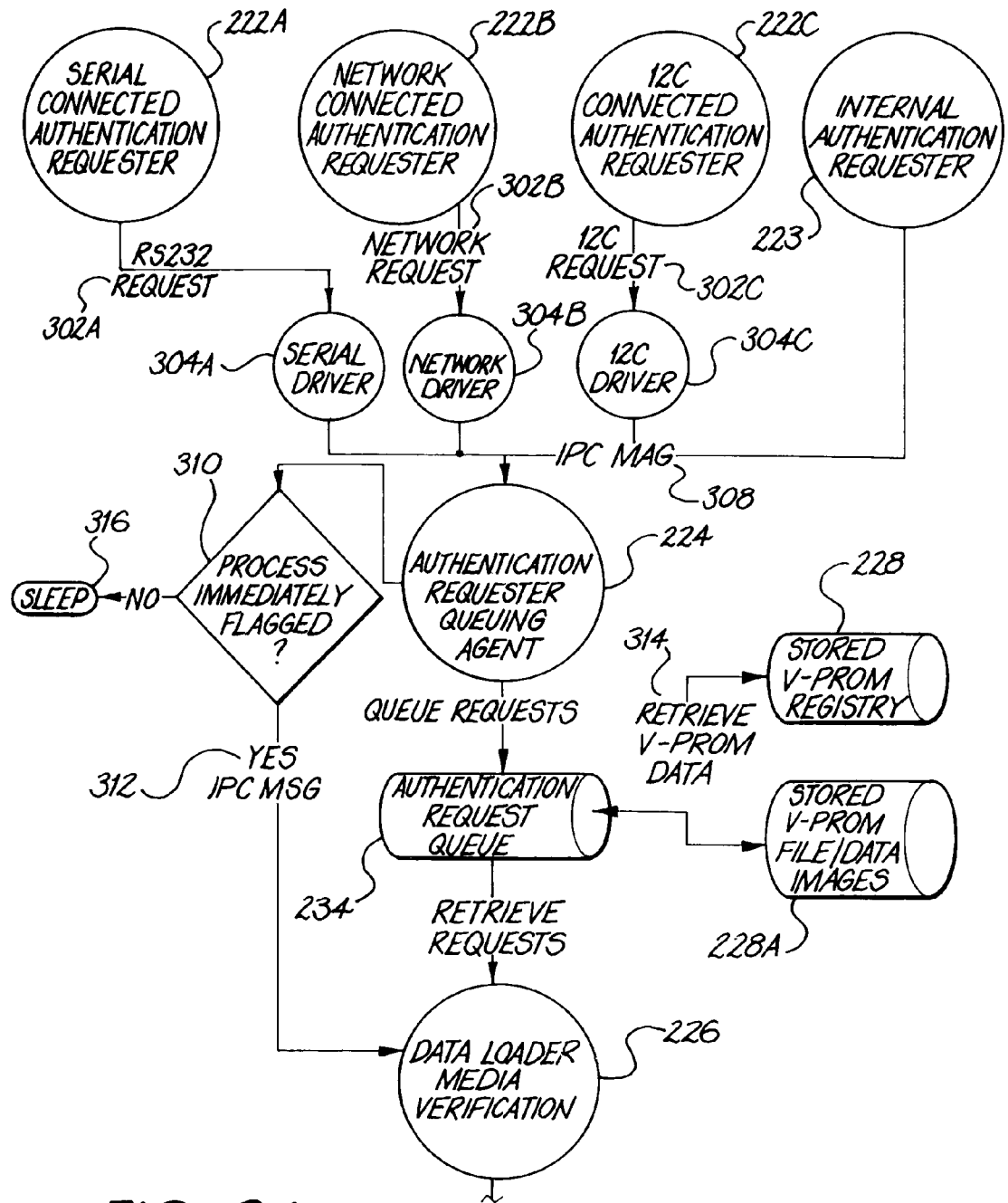
FIGS. 3A and 3B are block diagram describing the authentication process in greater detail than outlined in FIG. 2.

An overview of the verification and authentication process 220 is presented in FIG. 2 and described in the following few paragraphs. FIGS. 3A/3B describes the authentication process in greater detail. Identical reference numbers in FIG. 2 and FIGS. 3A/3B correspond to an identical step in the process. For this reason, the reader should follow both FIGS. 2 and 3A/3B, as appropriate. Referring to FIGS. 3A/3B, requests are emitted by the external requesting agents 222

Figure 3B:
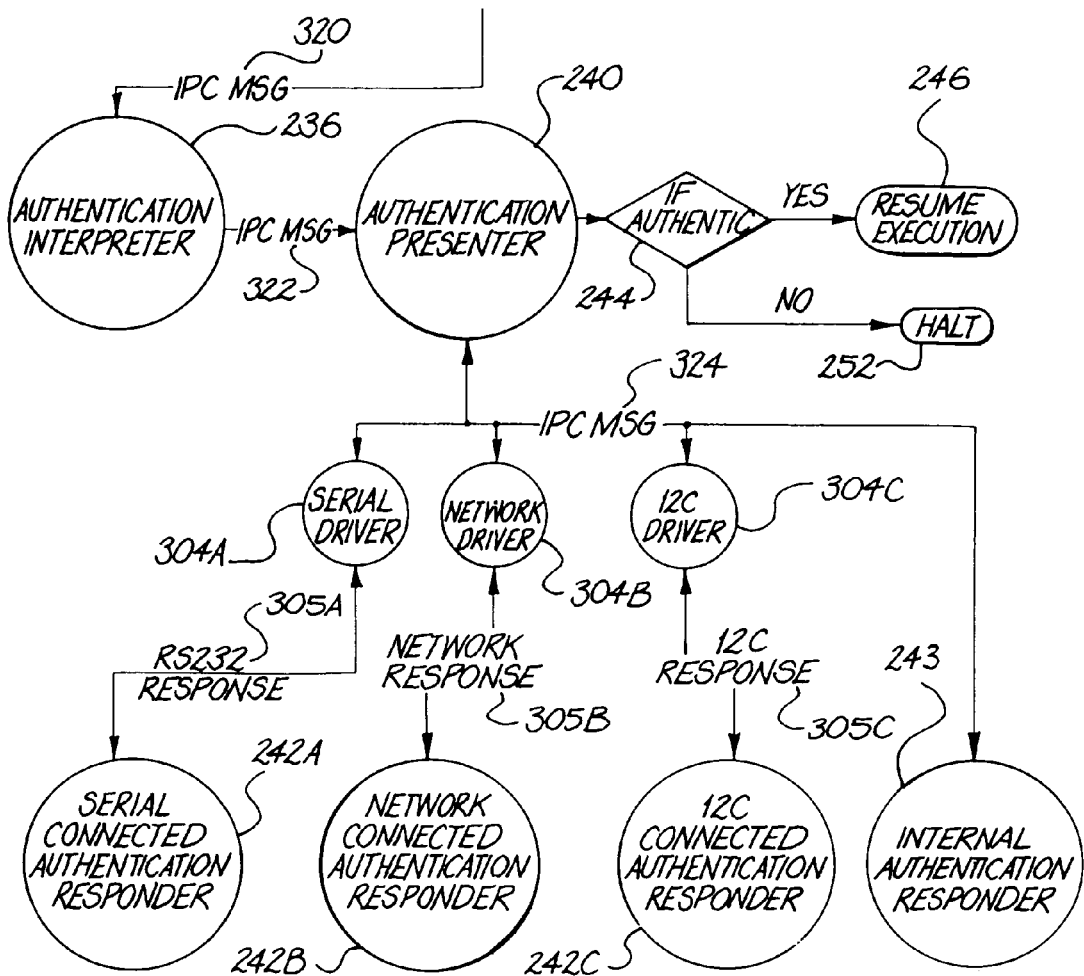

A-C which are in electronic communication with the present invention and transmitted to the authentication requestor queuing agent 224. Each of the connected authentication requestors, i.e. the serial connected authentication requestor 222A, the network connected authentication requestor 222B, and the I²C connected authentication requestor 222C issue a request which is handled by serial driver 306A. As shown in FIGS. 3A and 3B, similar requests and drivers handle the other authentication requestors 222B and 222C. The optional internal authentication requestor 223 communicates directly with the authentication requestor queuing agent 224 by generating its own IPC message. These requests for authentication originate from the "Authentication Requesters" 222A-C, or 223. Properly formatted requests in the form of an (IPC Message 308) are queued by the Authentication Engine 224 in the Authentication Request Queue 234. Each request (IPC Message 308) contains a request code, scheduling information (i.e., whether it should be processed immediate, timed/periodic, or upon the occurrence of a triggering event/semaphore), an Authentication Responder Selection Code (which selects the authentication responder 242A-C or 243 responder which will make the determination of authenticity, indicating which program file or data file, each with an appropriate appended signature file, is to be retrieved and a set of math instructions (algorithm) for the Authentication Interpreter 236. The Authentication Interpreter 236 processes the requested V-PROM image by applying the math instructions contained in the queued request to each binary word of data comprising the retrieved V-PROM image 228A. The resulting value is termed the Authentication (ID) 238. The Authentication Presenter 240 then reports the generated Authentication ID 238 to one of the externally located Authentication Responder Agent 242A-242C, designated by the responder code of the queued request. The Authentication Responder Agent (242A-C, or 243) makes the determination as to whether the resulting calculated Authentication ID is consistent with that of an authentic, previously released, tested, inspected, and legally approved V-PROM image of the same name. The authentication identification for a given program file or data file is stored within the authentication responder agents, 242A-C or 243. If the generated authentication (id) 238 matches the authentication (id) stored in the authentication responder agent, 242A-C or 243, as appropriate, then the program file or data file is deemed to be authentic, and at 246, the operation of the gaming device is continued. If the generated authentication (id) 238 does not match that stored in the authentication responder agent, at 252 the operation of the gaming device is halted.

Every time a new V-PROM image is released by a manufacturer, each compliance agency inspects and test the V-PROM. After assuring jurisdictional compliance, the testing lab runs the authentication process on the approved V-PROM, using their own unique authentication request math instructions, resulting in a new Authentication ID 238 for that jurisdiction. This new id is recorded and distributed to Authentication Responder Agents for that jurisdiction. Authentication responses can be electronically conveyed or manually entered by a field Agent.

Each individual authentication requestor (an agent) is initially registered with the system via a registration Inter-Process Communication, IPC, message 308.

The authentication queuing agent 224 cross examines the IPC request, checking the IPC message 308 for formatting errors. Properly formatted messages 348 are stored in the authentication request queue 234 and then acknowledged via a return IPC message. Errant requests (i.e., IPC messages that are improperly formatted or contain other errors detected by the authentication queuing agent 224) are also reported to the initiating requester (through a return IPC Message—not depicted). If the request is flagged for immediate processing 310 because it contains coding indicating it is be processed immediately, the loader 226 is informed via an IPC message 312. The loader 226 accesses the request stored in the queue 234, then, at 314 retrieves the requested V-PROM image 228A according to the registry 228 given, from storage media 228A. The authentication interpreter 236 is called via an IPC message 320 and processes the V-PROM image retrieved 228A using the request math instructions (algorithm) stored in the queue 234. The resulting authentication id 238 (FIG. 2) is sent from authentication interpreter 236 (FIG. 3B) via IPC message 322 to the authentication presenter 240. The presenter 240 routes the id to the responder agent 242, either the serial connected authentication responder 242A, the network connected authentication responder 242B, the I²C connected authentication responder 242C, or the optional internal authentication responder 243 as designated by the contents of the queued request at 234. The responder 242A-C, or 243 sends either an approval or denial response back to the presenter 240. The IPC message 324 issued by the authentication presenter 240 is routed to the particular connected authentication responder (242A-C) by a corresponding driver (304A-C). Thus, as shown in FIGS. 3A and 3B, serial driver 304A routes the IPC message and responds to serial connected authentication requestor 242A, the network driver 304B to 242B, etc. The internal authentication responder 243 receives its IPC message directly.

If the request is approved by the responder at 244, 240 deletes the queued request and at 246 continues normal execution; if not approved, at 252 the game is halted and an appropriate error message is displayed. The operation of the present invention can be illustrated by the following example, involving an immediate authentication request for the "SYSTEM" V-PROM. A subroutine of the authentication engine known as the Authentication Request Agent 222 would queue at 224 the request, signaling the loader 226 to retrieve the named V-PROM data/program group 228, in this example, the "SYSTEM" V-PROM. The loader 226 retrieves and verifies the integrity of each component of the "SYSTEM" V-PROM at 230-234 handing off the verified data to the Authentication Interpreter 236. The Authentication Interpreter 236 computes an Authentication ID 238 for the V-PROM based on the instructions given in the request. The Authentication ID 238 is reported by the presenter 240 to an Authentication Responder 242A-C or 243 that was named in the queued request. The Authentication Responder 242A-C or 243 either replies to the Presenter 240 that the id is authentic at 244 or it replies that the id is not approved at 252. The Presenter 240, based on the response, either continues normal execution of the game at 246, or at 252 halts the device, displaying an authentication error. This error will persist until the system is reset through a manual process performed at the device.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A system, comprising:
at least one digital storage medium comprising gaming software;

a gaming machine comprising at least one processor configured to authenticate and execute gaming software of the at least one digital medium; and an authentication agent apparatus, wherein said authentication agent apparatus is external to said gaming machine and further wherein said authentication agent apparatus is configured to:

transmit an authentication algorithm to said gaming machine, the authentication algorithm including at least one instruction arranged for processing by said gaming machine to authenticate said gaming software;

receive from said gaming machine an outcome of said authentication algorithm applied to said gaming software;

compare said received outcome with an expected outcome; and authenticate said gaming machine if said received outcome matches said expected outcome.

2. The system of claim 1, wherein an external agent apparatus
prompts said gaming machine to request and execute said authentication algorithm for said at least one digital medium, and
enrolls said gaming machine when said received outcome matches at least one of a set of predetermined criteria.

3. The system of claim 1, wherein execution of said authentication algorithm by said gaming machine is carried out based on at least one of a request of said gaming machine, a request of a player of said gaming machine, a request of an authorized agent, and upon a randomly or periodically scheduled event.

4. The system of claim 1, further comprising a data storage device configured to historically store said received outcome.

5. The system of claim 1, wherein said at least one processor is further configured to execute a verification algorithm to generate a verification signature of said gaming software.

6. The system of claim 1, wherein the at least one processor of the gaming machine is further configured to process said authentication algorithm to determine at least one of corruption of said at least one digital medium and tampering with said at least one digital medium.

7. The system of claim 1, wherein said authorization agent apparatus is remote to said gaming machine and coupled to said gaming machine via a communication link for transmission of said authentication algorithm to said gaming machine.

8. A method for authenticating gaming software of at least one digital storage medium in a system including a gaming machine and an external authentication agent apparatus, said method comprising:

transmitting an authentication algorithm from said external authentication agent apparatus to said gaming machine, the authentication algorithm comprising a plurality of instructions to be executed by said gaming machine;

deriving an outcome of said authentication algorithm applied to the gaming software of the at least one digital storage medium by execution of the authentication algorithm by said gaming machine;

receiving with said authentication agent apparatus said outcome from said gaming machine;

comparing with said authentication agent apparatus said outcome with an expected outcome; and authenticating said gaming machine with the authentication agent apparatus if said outcome matches said expected outcome.

9. The method of claim 8, further comprising prompting said gaming machine to execute said authentication algorithm for said at least one digital medium and enrolling said gaming machine when said received outcome matches at least one of a set of predetermined criteria.

10. The method of claim 8, further comprising executing said authentication algorithm based on at least one of a request of said gaming machine, a request of a player of said gaming machine, a request of an authorized agent, and upon a randomly or periodically scheduled event.

11. The method of claim 8, further comprising storing any received outcome from said gaming machine for recollection thereof.

12. A gaming machine comprising:
a gaming controller; and
a data storage device storing data files of games executed by the gaming controller and data corresponding to a valid verification signature,
wherein the gaming controller comprises an interface for loading data external from said gaming machine to said data storage device, and a processor to process a verification algorithm to derive a verification signature and compare said derived signature to said valid signature, and to process an authentication algorithm received via the interface, and
wherein the authentication algorithm comprises a plurality of instructions to be executed by the processor of said gaming machine to authenticate said data files of games.

13. A method for presenting at least one game to a player at a gaming machine, said method comprising:

storing one or more program files for the at least one game in a digital storage medium;

transmitting via a communication link an authentication algorithm to said gaming machine from an authentication agent apparatus, the authentication algorithm including at least one instruction arranged for processing by said gaming machine to derive an outcome of said one or more program files;

processing said authentication algorithm to derive an outcome of said one or more program files for the at least one game via said gaming machine, receiving said outcome from said gaming machine, comparing said received outcome to one of an authorized outcome stored in said digital storage medium or transmitted with said authentication algorithm to determine whether the one or more program files are authentic, and presenting said at least one game to the player at the gaming machine if the one or more program files are determined to be authentic.

14. The method of claim 13, wherein a player is unable to play said at least one game until said one or more program files are determined to be authentic.

15. The method of claim 13, further comprising processing said authentication algorithm in response to the player attempting to execute a game of the at least one game.

16. The method of claim 13, further comprising downloading the one or more program files from the digital storage medium to said gaming machine, and
initiating processing of said authentication algorithm in response to downloading the one or more program files to said gaming machine.

17. The method of claim 13, further comprising triggering, with an agent apparatus external to said gaming machine, transmission of said authentication algorithm and said one or more program files.

18. The method of claim 13, further comprising registering said outcome for an audit.

19. The method of claim 13, further comprising transmitting an authentication identifier with said authentication algorithm.

20. The method of claim 13, further comprising processing said authentication algorithm for identification of at least one of corruption of said one or more program files stored on said digital storage medium and tampering with said one or more program files stored on said digital storage medium.

21. A system for monitoring a gaming machine, said system comprising:
   an authentication agent apparatus; and
   a regulating agent apparatus to monitor at least a portion of said gaming machine,
   wherein said regulating agent apparatus generates a request for an authentication agent apparatus, and
   wherein said authentication agent apparatus is configured to:
      transmit an authentication algorithm to said gaming machine, the authentication algorithm comprising a plurality of instructions to be executed by said gaming machine to derive an outcome of said authentication algorithm applied to at least said portion of said gamine machine;
      receive from said gaming machine an outcome of said authentication algorithm applied to at least said portion of said gaming machine;
      compare a received outcome from said authentication algorithm at said gaming machine with an expected outcome; and
      authenticate said gaming machine if said received outcome matches said expected outcome.

22. The system of claim 21, wherein said regulating agent apparatus is located remotely from said gaming machine to remotely monitor at least said portion of said gaming machine.

23. The system of claim 21, wherein
   said regulating agent apparatus monitors all data stored in a digital storage medium of said gaming machine, and
   said authentication agent apparatus authenticates said data stored in said data storage medium of said gaming machine.

24. The system of claim 21, wherein said authentication agent apparatus is configured to verify that said gaming machine satisfies local gaming regulations.

25. The system of claim 21, wherein said regulating agent apparatus monitors software and peripheral devices of said gaming machine.

26. The system of claim 21, wherein said authentication agent apparatus via said received outcome of said authentication algorithm detects tampering or rigging of software within said gaming machine.

27. The system of claim 21, wherein said authentication agent apparatus authenticates data stored on a digital storage medium in said gaming machine based upon said received outcome of said authentication algorithm.

* * * * *